United States Patent Office 3,427,869
Patented Feb. 18, 1969

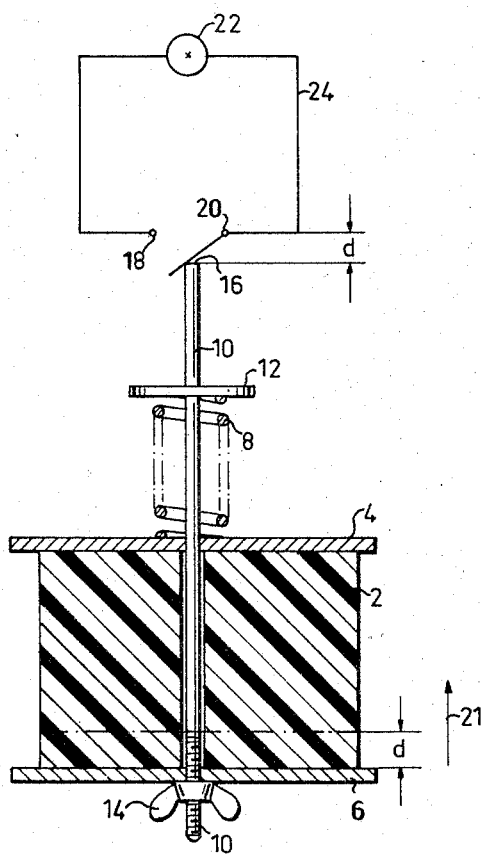

3,427,869
FLUID-DETECTING SYSTEM
Nils Gunnar Rikard Karlbom, Lidingo, Sweden, assignor to Ingeniorsfirma G. Karlbom A.B., Lidingo, Sweden, a corporation of Sweden
Filed July 13, 1965, Ser. No. 471,639
Claims priority, application Sweden, July 16, 1964, 8,699/64
U.S. Cl. 73—73         3 Claims
Int. Cl. G01h 25/56

ABSTRACT OF THE DISCLOSURE

A detection system for petroleum or the like, for example, when leaking from storage tanks, comprises a body of polystyrene foam which is waterproof but which is softened by petroleum. The body of plastic foam is placed in compression in such a way that when softened by petroleum, it will at least partially collapse and a member movable with the collapsing body will close an alarm circuit.

---

This invention relates to a device for detecting fluids, especially petroleum products leaking from an oil storage tank.

In case of tanks for petroleum products dug down into the ground it is very desirable to be informed of leakage of the contents of the tank. Since the specific weight of petroleum products is practically always lower than the specific weight of water the product that leaks or otherwise comes out of the tank will float on the surface of the underground water. It is of great importance to detect a starting leakage as soon as possible so that measures can be taken before water supplies are contaminated.

The specific amount of fluid to be detected is in most cases small and is often absorbed by the ground material. Therefore, the sensing body must be able to react with minute quantities of the fluid. Units based on a complete dissolving of the sensing body will only function when large quantities of fluid are present and will not function under the conditions mentioned above. In the majority of cases, water is present and the sensing body must not be affected either by moisture or free water.

Certain types of plastics, such as foamed plastics of polystyrene, have a certain mechanical strength that makes it possible to subject a body of such plastics to a certain force without significant deformation of the body. This property is maintained even if the body is immersed in water. However, if the body comes into contact with some petroleum product it absorbs this product and its mechanical properties are changed so that the material of the body softens. If in this case the body is subjected to a certain load as mentioned above its dimension will be reduced in the direction of the load.

When the fluid comes in contact with the outer surface of the sensing body, it will first be absorbed by the layer adjacent to the surface. When this layer is saturated and provided more fluid is fed to the body, the penetration will proceed inwards, producing a gradual decrease in the body's mechanical strength.

The sensing body can be exposed to a specific pressure slightly below that which will result in a permanent deformation when the body is unaffected by the fluid to be detected. As the fluid is gradually absorbed and the strength of the body gradually decreased inwards, the specific pressure on the part not yet affected by the fluid increases and will result in a deformation of the body even if it has only partially absorbed the fluid.

In accordance with this invention a device for detecting a fluid, such as a petroleum product, is characterized in its broadest aspect by a body subjected to an external force and consisting of a material, such as foamed plastic of polystyrene, which upon absorption of the fluid undergoes such change of its mechanical properties as to soften, wherein a change of the dimension of said body under the action of and in the direction of said force actuates a member adapted to operate a switch or the like for activating an alarm circuit.

According to a preferred embodiment of the invention the body is firmly held between two plates which by means of a compression spring are urged toward each other, one of the plates being movable relative to the other one and connected to an operating rod adapted to actuate a switch in the alarm circuit.

The invention will now be described more closely with reference to the annexed drawing which partly in section and diagrammatically illustrates a preferred embodiment of a device according to the invention.

A body 2 consisting of foamed plastic, such as polystyrene, is firmly held between two plates 4 and 6. By means of an operating rod 10 which freely extends through coaxial holes in the plates 4 and 6 and the body 2 a compression spring 8 acts on the side of the plate 6 remote from the body. One end of the spring 8 bears on the fixed plate 4 and the other end of an abutment 12 secured to the rod. A nut, such as a wing nut 14, is screwed onto the free end of the rod 10 and abuts the plate 6. By means of this nut the compression of the spring 8 can be controlled. The other end 16 of the operating rod is suitably connected to a switch 20 for operating this switch.

The mode of operation of the device is as follows.

If the plastic body 2 absorbs a petroleum product it softens and can no longer resist the pressure from the plate 6 which due to the compression of the spring compresses the body a certain distance $d$ in the direction of the arrow 21. Since the operating rod follows the movement of the plate 6, its operative end 16 will be moved a distance $d$ sufficient to actuate the switch 20 which as indicated in the drawing may be arranged to complete an electric circuit 24 comprising a signalling device 22.

It will be understood that the invention is not limited to the embodiment illustrated and described but can be modified in various manners within the scope of the appended claims.

What I claim is:

1. A device for detecting petroleum products comprising a body of foamed plastic which is unaffected by water but which will soften when contacted by a petroleum product, spring means to exert a load on said body for reducing one dimension of the body only when the body softens, and means responsive to the reduction of said dimension for activating an alarm.

2. A device according to claim 1, and a fixed member abutting one side of said body and a movable member abutting the opposite side of said body, an operating rod in engagement with said movable member, said spring means exerting said load to move said rod together with said movable member toward said fixed member upon softening of said body, said responsive means being responsive to the movement of said rod to activate said alarm.

3. A device according to claim 2, in which said rod passes through said body and through said fixed member, and said spring means acts between said rod and said fixed member on the side of said fixed member which is opposite said body.

References Cited

UNITED STATES PATENTS

| | | | |
|---|---|---|---|
| 1,465,351 | 8/1923 | Dixon | 116—118 |
| 2,432,367 | 12/1947 | Andresen | 340—242 |
| 2,612,036 | 9/1952 | Angona | 73—73 |
| 2,693,781 | 11/1954 | Opp et al. | 116—118 |
| 2,740,371 | 4/1956 | Nelson | 73—73 |
| 2,899,517 | 8/1959 | Hastings et al. | 116—118 |
| 3,148,544 | 9/1964 | Brown et al. | 73—119 |

RICHARD C. QUEISSER, *Primary Examiner.*

C. J. McCLELLAND, *Assistant Examiner.*

U.S. Cl. X.R.

73—61; 340—235